United States Patent [19]

Retallick

[11] Patent Number: 4,576,800

[45] Date of Patent: Mar. 18, 1986

[54] CATALYTIC CONVERTER FOR AN AUTOMOBILE

[75] Inventor: William B. Retallick, West Chester, Pa.

[73] Assignee: Camet, Inc., Hiram, Ohio

[21] Appl. No.: 650,085

[22] Filed: Sep. 13, 1984

[51] Int. Cl.$^4$ ............................................... F01N 3/10
[52] U.S. Cl. .................................... 422/180; 502/439; 502/527
[58] Field of Search ............... 502/439, 527; 156/197; 422/180; 428/593

[56] References Cited

U.S. PATENT DOCUMENTS

| | | | |
|---|---|---|---|
| 4,098,722 | 7/1978 | Cairns et al. | 502/527 X |
| 4,162,993 | 7/1979 | Retallick | 502/527 X |
| 4,190,559 | 2/1980 | Retallick | 502/527 X |
| 4,247,422 | 1/1981 | Davies | 502/527 X |

*Primary Examiner*—W. J. Shine
*Attorney, Agent, or Firm*—William H. Eilberg

[57] ABSTRACT

The catalytic converter comprises a metal honeycomb catalyst support which is anchored in a canister so that it cannot telescope or blow out. The honeycomb catalyst support is formed by folding a strip of metal back and forth upon itself. There are slots in the strip along the lines of folding. When the strip is folded to form the honeycomb, the slots become notches, the notches being aligned so as to define grooves on the periphery of the honeycomb. The canister has internal ridges that mate with the grooves on the honeycomb and anchor the honeycomb.

10 Claims, 8 Drawing Figures

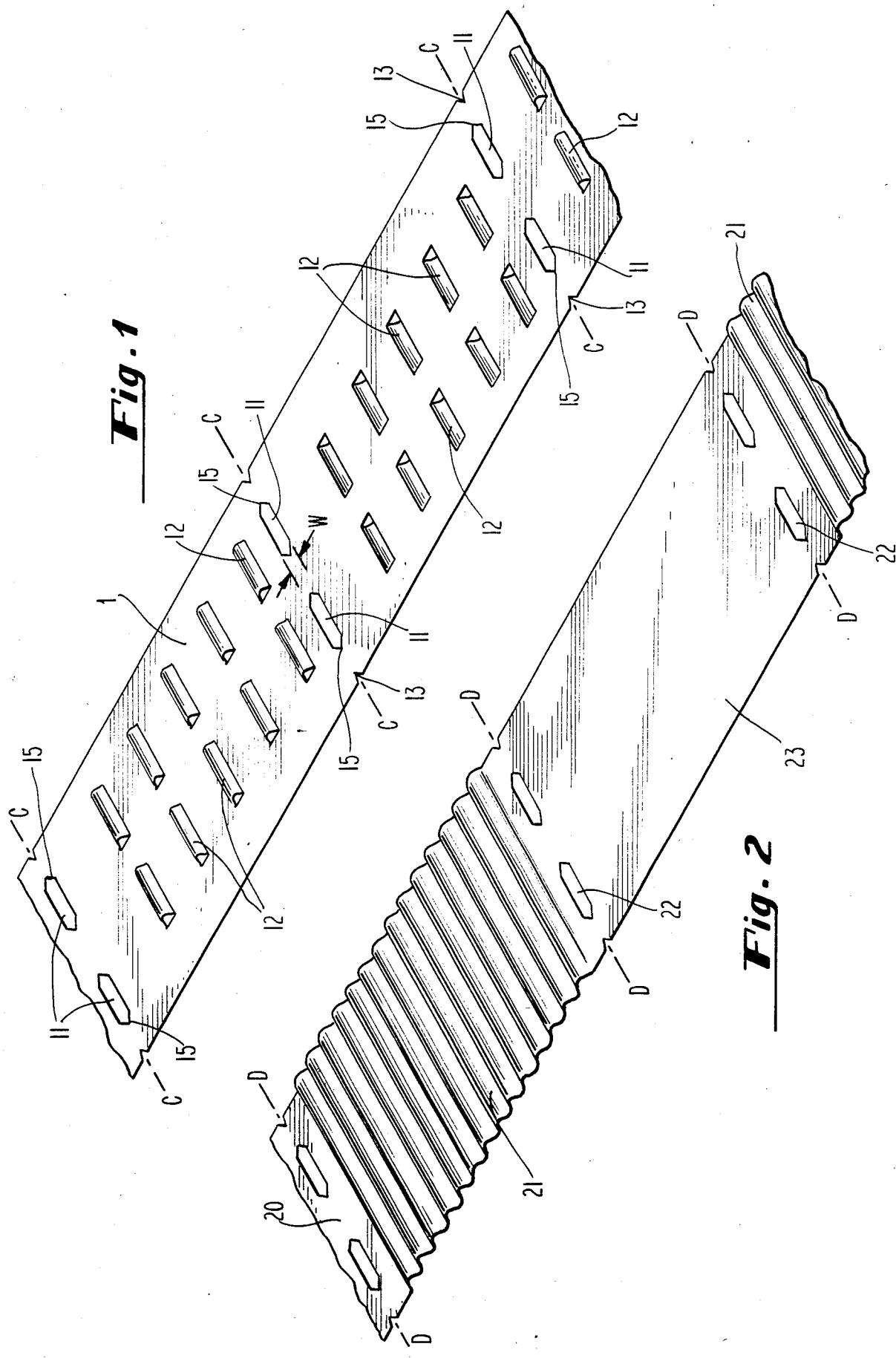

CATALYTIC CONVERTER FOR AN AUTOMOBILE

BACKGROUND OF THE INVENTION

Metal honeycomb catalyst supports have been proposed for converters for automobiles. One way to make a metal honeycomb is to lay a corrugated strip of metal on a flat strip of metal, and to wind the two strips upon themselves to make a spiral. Spiral-wound converters have a fatal shortcoming when they are used for automobile converters: they telescope outwardly under the pulsating flow of the engine exhaust. A method that has been used to prevent the telescoping consists of brazing together the layers of the spiral over a short length of spiral, at both ends of the spiral. This method is expensive, and in addition, it restricts the metal alloy of the spiral to metals that can be brazed. Such alloys do not always make satisfactory catalyst supports.

Another way to make a honeycomb is to fold a strip of metal back and forth upon itself. My U.S. Pat. No. 4,402,871, the disclosure of which is incorporated by reference herein, describes such a honeycomb. The face of the honeycomb can have any shape such as a circle or an ellipse, which is commonly used for automobile converters. These folded honeycombs must be anchored in place in their metal shells, called canisters. One method of anchoring the honeycomb is to crimp the end of the canister over the face of the honeycomb. It is easiest to form a crimp on a small circular canister, more difficult on a large circular canister, and most difficult on a canister having an elliptical shape.

This invention provides a simple structure for a catalytic converter, wherein the folded honeycomb is firmly anchored within the canister. The disclosed structure also is adapted to high speed mass production.

SUMMARY OF THE INVENTION

The catalytic converter of the present invention is made by folding a strip of metal back and forth upon itself to form a honeycomb catalyst support. The spacing between the layers in the honeycomb is maintained by indentations in the strip, as described in U.S. Pat. No. 4,402,871, or by corrugating the strip. Each fold is made upon a line of slots extending across the width of the strip. When the strip is folded, the slots become notches, which, after several layers of the strip have been folded, are aligned to form grooves on the periphery of the honeycomb.

The honeycomb catalyst support is mounted in a canister having internal ridges that mate with the grooves on the honeycomb and thereby anchor the honeycomb. The honeycomb can have several grooves, each groove mated with a ridge on the canister. This structure for anchoring the honeycomb is simpler than crimping the end of the canister over the face of the honeycomb. Also, it anchors the honeycomb in several places, instead of in just one place.

It is therefore an object of the invention to provide a catalytic converter for an automobile, wherein the converter comprises a metal honeycomb catalyst support anchored in a canister.

It is another object to provide a catalytic converter as described above, wherein the catalyst support cannot telescope or blow out.

It is another object to provide a catalytic converter as described above, wherein the catalyst support can be made from a single strip of metal folded back and forth upon itself.

It is another object to provide a prepared metal strip which, upon being folded back and forth upon itself, becomes a multi-layer honeycomb catalyst support having a predetermined cross-section.

It is another object to provide a method for making the catalytic converter described above, the method being adapted to high speed mass production.

Other objects and advantages of the invention will be apparent to those skilled in the art from a reading of the following brief description of the drawings, the detailed description of the invention, and the appended claims.

BRIEF DESCRIPTION OF THE DRAWINGS

FIG. 1 is a perspective view of a strip of metal having indentations, the strip being ready to be folded so as to form a catalyst support.

FIG. 2 is a perspective view of another a strip of metal to be folded to form a catalyst support, the strip having corrugations to maintain the spacing between layers.

DETAILED DESCRIPTION OF THE INVENTION

Figure 3:
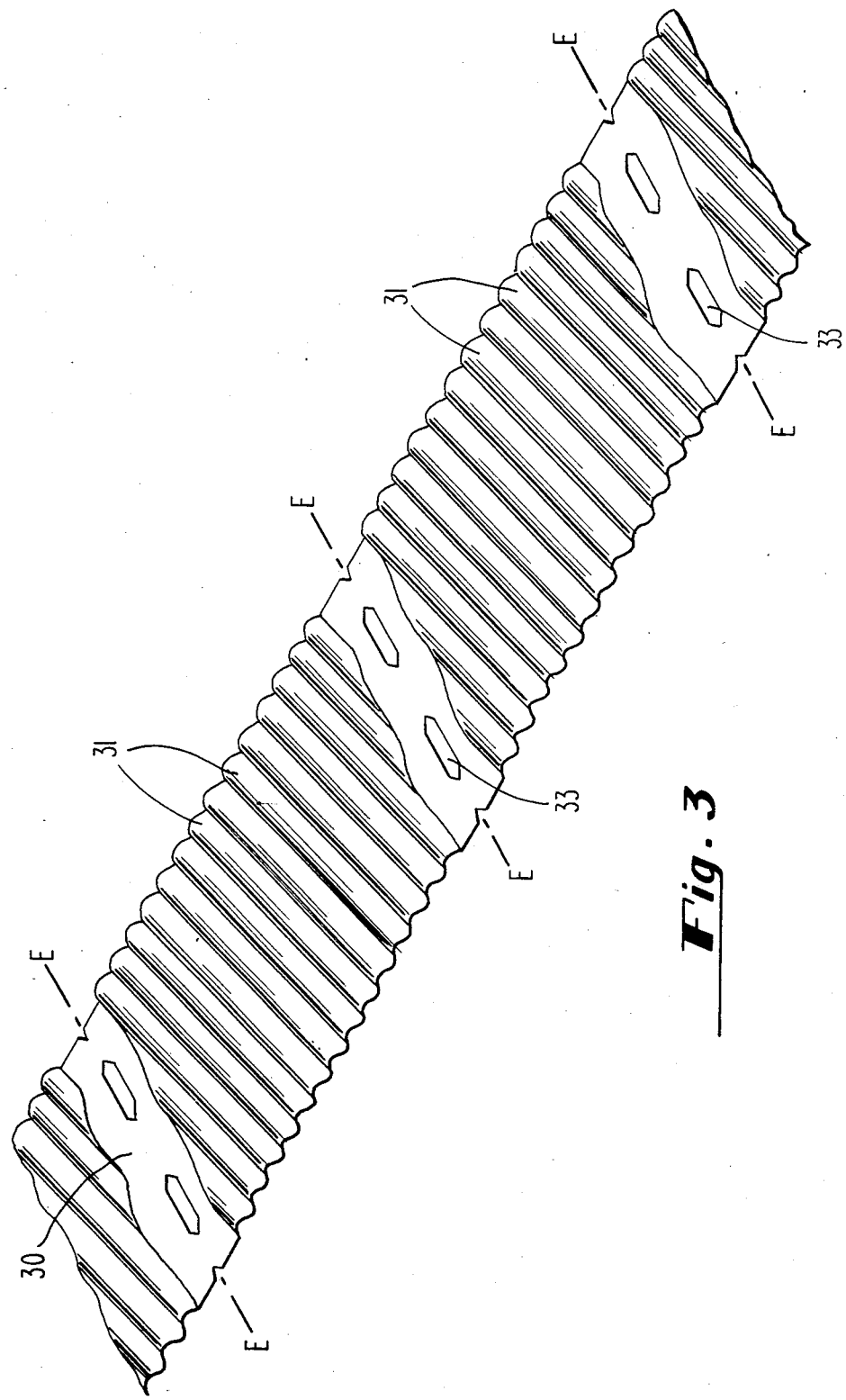
FIG. 3 is a perspective view of still another strip of metal to be folded to form a catalyst support, the strip having oblique corrugations that maintain the spacing between layers.

The catalytic converter of the present invention is made by folding a metal strip back and forth upon itself to form a honeycomb catalyst support. FIG. 1 is a perspective view of a length of a metal strip 1 which is ready to be folded along lines CC. There is a row of slots 11 along each line CC, and the pattern of the slots is the same along each line. The slots 11 terminate at each end in a pointed apex 15 so that when the strip is folded, the bending stress is focused on the straight line that runs through the center line of the slots.

When the strip 1 is folded, the slots 11 form notches at the folds in the strip. The strip 1 is folded back and forth upon itself, i.e. in a zigzag pattern, and the folded strip 1 becomes a honeycomb catalyst support. Because the pattern of the slots 11 is the same along each line CC, the notches will be aligned into grooves on the periphery of the honeycomb formed by folding the strip. These grooves mate with the ridges in a canister, described below, thereby anchoring the honeycomb to the canister. The width of the slots is indicated by W in FIG. 1, and W determines the depth of the grooves, as will be explained later.

Indentations 12 are formed on strip 1 in the regions between the lines CC. In alternate regions the indentations 12 are located on opposite sides of the strip. When strip 1 is folded upon itself, in a zigzag pattern, all of the indentations 12 will be aligned in the same direction. Further, the pattern of the indentations 12 in alternate layers of the folded strip 1 is different so that the indentations 12 cannot coincide and nest together. This construction of indented layers which do not nest together is described in U.S. Pat. No. 4,402,871.

The metal strip 1 also has outboard notches 13, which facilitate bending of the strip precisely on the lines CC.

In practice, the strip 1 may be about 3–6 inches wide, and the indentations about ½ inch long. However, these dimensions can be varied considerably without departing from the scope of the invention.

The distance between adjacent pairs of lines CC in FIG. 1 is predetermined, so as to control the ultimate cross-sectional shape of the folded strip. The number of indentations in the regions of the strip between the folding lines CC may vary from region to region, according to the desired width of the honeycomb catalyst support at that particular layer. If the distance between lines CC is constant from region to region, then the cross-section of the folded strip will be rectangular.

The strip may be formed with the aid of a digital computer which translates the desired final cross-section of the honeycomb into an appropriate pattern of slots and indentations on the metal strip. The computer may be programmed to prepare the strip to form a honeycomb of virtually any desired cross-section. The strip can then be rapidly folded into a honeycomb shape.

FIG. 2 shows an alternative embodiment of the catalyst support used to construct the catalytic converter. Metal strip 20 is corrugated between alternate pairs of lines DD. When strip 20 is folded back and forth upon itself, the resulting honeycomb will have flat layers 23 alternating with corrugated layers 21. The corrugations in FIG. 2 are shown generally perpendicular to the axis of strip 20, but other orientations can be used.

FIG. 3 shows still another embodiment of the strip used to form the catalyst support. In FIG. 3, metal strip 30 has oblique corrugations 31 occupying all of the regions between pairs of lines EE. Corrugations 31 are shown at an acute angle relative to the lines EE. When strip 30 is folded in a zigzag pattern, the corrugations in successive layers will cross each other so that they cannot nest together. The oblique corrugations can extend across the strip in straight lines, or they can have the form of a chevron or a herringbone.

FIGS. 1, 2, and 3 show just three constructions for maintaining the spacing between the layers in the folded strip. Other constructions could be used.

Figure 4:
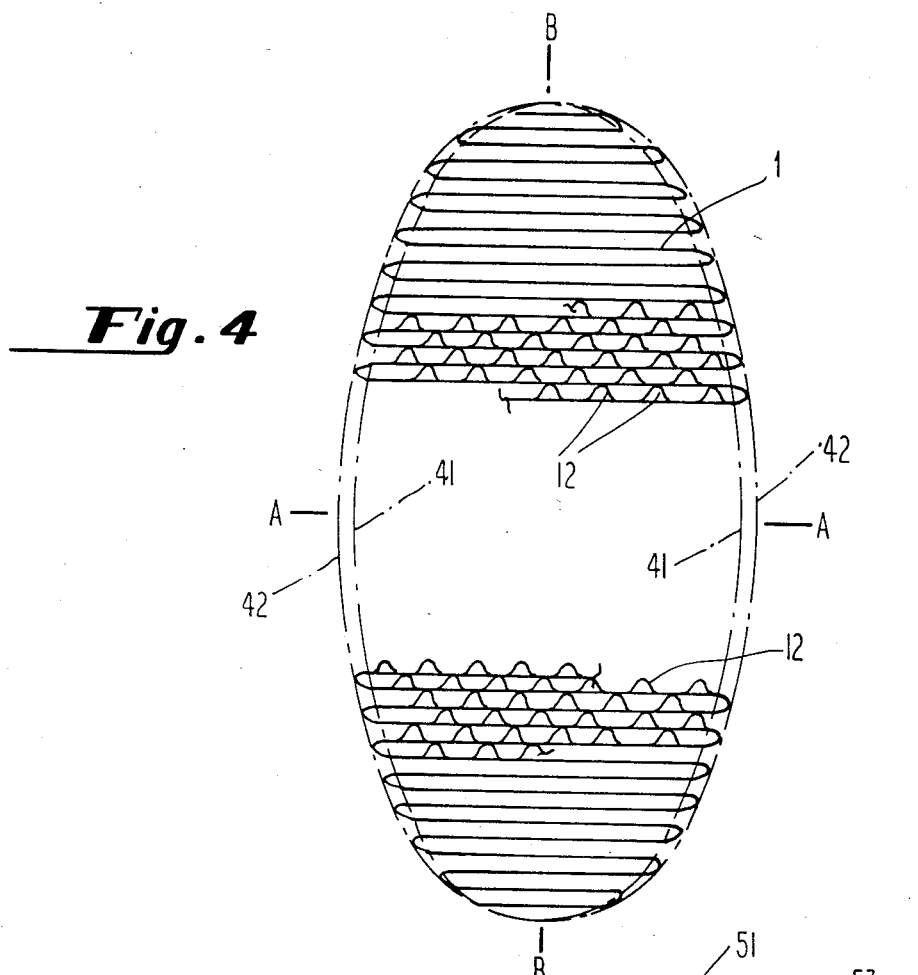
FIG. 4 is a fragmentary end view of a honeycomb catalyst support, made by folding the strip shown in FIG. 1.

FIG. 4 is a fragmentary end view of a honeycomb catalyst support made by folding the strip shown in FIG. 1 in a zigzag pattern. Strip 1 and some of the indentations 12 are clearly visible. The strip has been folded to form a honeycomb having a generally elliptical cross section. As stated above, virtually any desired cross section can be obtained by proper choice of the spacing of the rows of slots in the strip to be folded, and the height of the indentations or corrugations. The strips shown in FIGS. 2 and 3 can also be folded in a similar manner to produce a structure like that of FIG. 4, except that the indentations would be replaced with corrugations.

As used herein, the terms "honeycomb", "folded strip", and "catalyst support" have identical meanings. That is, when the strip is in the folded state, it assumes the form of a honeycomb, which is used as a catalyst support.

The dotted line 41 in FIG. 4 indicates the bottom of the groove formed by the notches at the folds in the strip. Dotted line 42 represents the periphery of the catalyst support. Where the layers of the honeycomb are perpendicular to the periphery, at points A, the depth of the grooves is one half W. Where the layers approach the tangent to the periphery, at points B, the depth of the groove, as measured along a line perpendicular to the tangent to the periphery at the given point, approaches zero.

Figure 5:
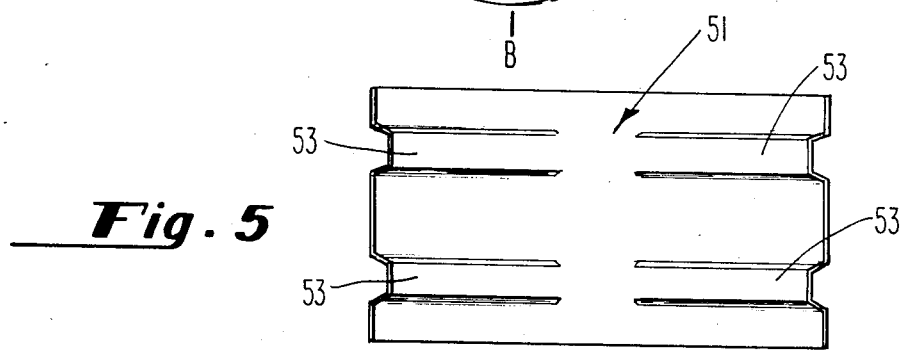
FIG. 5 is a view of the interior of a canister used to hold the honeycomb catalyst support, as seen from the line 5—5 in FIG. 6.
Figure 6:
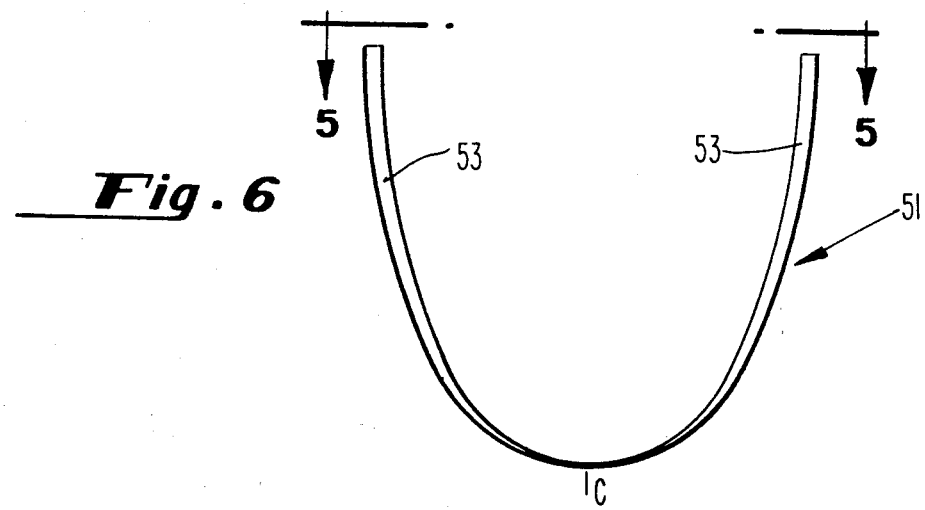
FIG. 6 is an end view of the canister used to hold the honeycomb catalyst support.
Figure 7:
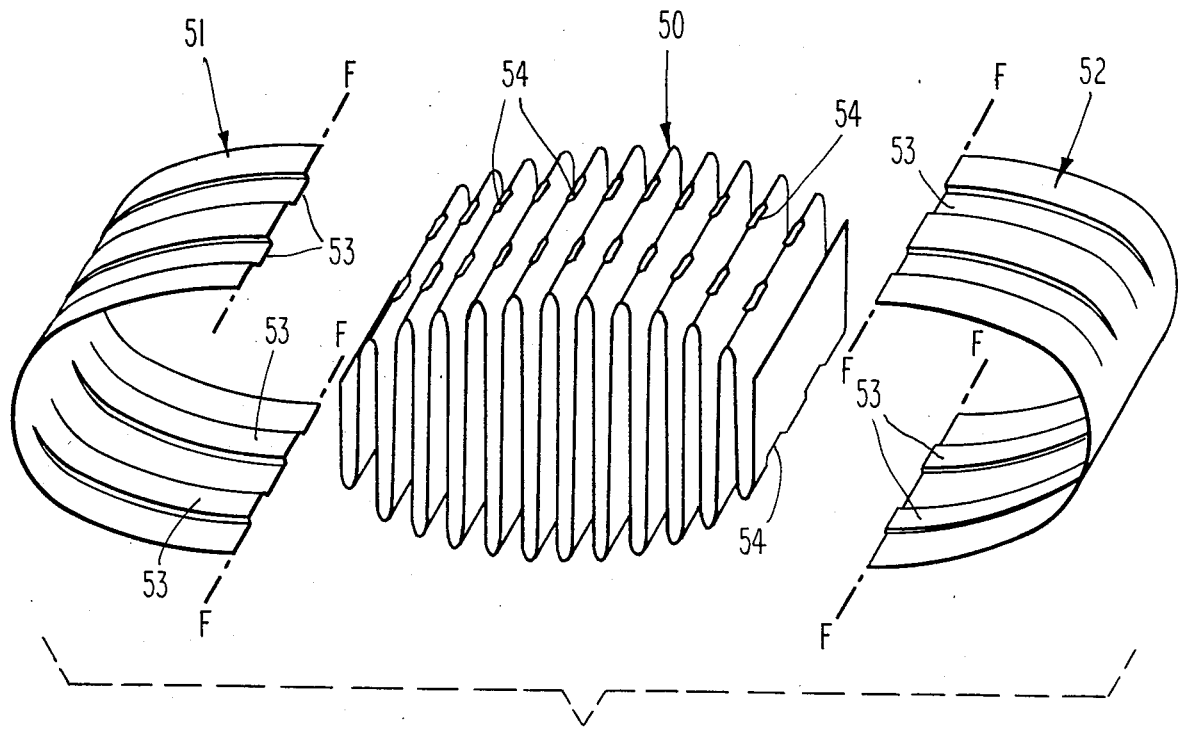
FIG. 7 is an exploded perspective view showing a honeycomb catalyst support and a pair of canister sections for holding the support.

The canister used to hold the honeycomb catalyst support is illustrated in FIGS. 5, 6, and 7. FIG. 7 is an exploded perspective view showing honeycomb catalyst support 50 made by folding a metal strip back and forth upon itself. For the sake of clarity, no identations or corrugations are shown on the folded strip of FIG. 7.

FIG. 7 also shows, in perspective, two sections 51 and 52 which define a canister for holding the catalyst support. The canister sections 51 and 52 have ridges 53 that are adapted to mate with the grooves formed by the notches (indicated by reference numeral 54 in FIG. 7) on the catalyst support 50. In FIG. 7, the honeycomb 50 and the canister sections 51 and 52 are about to be clamped together around the honeycomb. The layers of the honeycomb will be compressed together, as they must be to obtain a rigid honeycomb that will remain firmly anchored. After the canister sections are wrapped around the honeycomb, the sections are welded together along lines FF.

The structure of one of the canister sections 51 is further illustrated in FIGS. 5 and 6. Ridges 53 are plainly shown in the view of FIG. 5, in which the canister section is seen from line 5—5 of FIG. 6. FIG. 6 is an end view which illustrates the gradual decrease of the depth of the ridges 53, towards the interior of canister section 51. At or before point C, the ridge has disappeared entirely. This gradual decrease of depth matches the gradual decrease of depth of the grooves defined by the notches on the folded strip, as described above. Also, the absence of a ridge at point C, at the bend of the canister section, makes the canister section flexible so that it can be opened slightly to receive the honeycomb catalyst support.

Although the canister illustrated in FIGS. 5–7 has two ridges, the canister can have any number of ridges, as long as the number of ridges equals the number of slots on the metal strip. The canister sections shown in the Figures are shaped to coincide with the elliptical cross-section of the folded strip shown. If the folded strip is to assume a different cross-sectional shape, the shape of the canister section is made to fit that shape.

Instead of constructing the ridges in the canister sections as illustrated in FIGS. 5 and 7, each ridge may comprise two narrow ridges, disposed to abut the sides of the corresponding groove of the folded strip. This construction is equally effective in anchoring the honeycomb.

Figure 8:
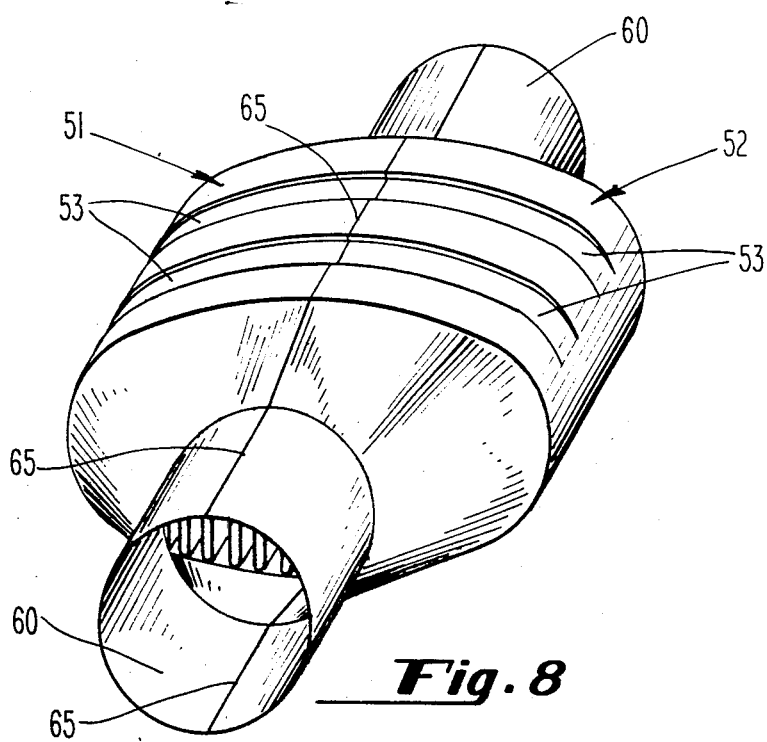
FIG. 8 is a perspective view showing a completed catalytic converter made according to the present invention.

FIG. 8 is a perspective view of the completed catalytic converter made according to the present invention. The canister sections 51 and 52 have been welded together to form a single canister, and transition pieces 60 have been welded onto each end of the canister. As is shown, transition pieces 60 comprise a union of frusto-conical and cylindrical sections. In FIG. 8, the frusto-conical portion of only one of the transition pieces 60 is visible.

Transition pieces 60 can also be formed as extensions of the canister sections 51 and 52. Then the converter shell would comprise just two metal stampings. The stampings would be welded together along line 65 in FIG. 8. In an alternative embodiment, the stampings could be constructed as one piece, having one seam permitting the shell to be opened and then closed around the catalyst support. The shell would then be welded along its one seam.

The metal strip used to form the honeycomb catalyst support is coated with a suitable catalyst. The strip can be coated before it is folded, or after it is folded and anchored in the canister.

The present invention thus also includes a method of making a catalytic converter, which method is suitable for use in high-speed mass production. The metal strip is punched to form the slots, and impressed with indentations or corrugations. The strip is then folded in a zigzag manner to form a honeycomb. The completed honeycomb is then enclosed in the canister.

It is possible to build up a honeycomb by stacking individual strips instead of by folding a single strip. The resulting honeycomb is not as rigid as a honeycomb made from a single strip.

It is apparent that the objects of the present invention are fulfilled by the above disclosure. It is understood that many variations of the invention are possible. For example, the number of ridges disposed on each canister section can be changed. The cross-sectional shape of the catalyst support can take almost any form. These and other modifications are to be deemed within the spirit and scope of the following claims.

What is claimed is:

1. A catalytic converter for an automobile comprising a single strip of metal folded back and forth upon itself, the strip having at least one slot along each line of folding, the slots being aligned with each other across adjacent layers of the strip, each folded slot defining a notch, the notches together defining at least one groove along the periphery of the folded strip, and at least one canister section, the canister section being shaped to coincide with the shape of the folded strip, the canister section having at least one ridge shaped to mate with the groove, the canister section being wrapped around the folded strip so as to maintain the strip in a fixed position.

2. The converter of claim 1, wherein the strip has indentations, the indentations being of equal height, wherein the spacing between adjacent layers of the strip is equal to this height, and wherein the indentations in adjacent layers of the folded strip are staggered so that the layers cannot coincide and nest together.

3. The converter of claim 2, wherein the indentations in alternate sections of the strip are disposed in opposite directions, whereby the indentations in the folded strip are all disposed in the same direction.

4. The converter of claim 1, wherein alternate layers of the strip are corrugated, and wherein the remaining layers of the strip are uncorrugated.

5. The converter of claim 1, wherein each layer of the strip is corrugated, and wherein the corrugations in adjacent layers of the strip are oriented in different directions, whereby the corrugations in adjacent layers of the strip cannot coincide and nest together.

6. The converter of claim 3, wherein there are two canister sections, the canister sections being clamped around the folded strip.

7. The converter of claim 6, further comprising a pair of transition pieces for directing gas into, and out of, the converter, the transition pieces being mounted at the ends of the folded strip, so as to permit the flow of gas through the folded strip.

8. A method of making a catalytic converter for an automobile, comprising the steps of:
   (a) punching a metal strip with a plurality of rows of slots,
   (b) forming indentations in the strip in the regions between adjacent rows of slots, the indentations in adjacent regions being formed so as to be staggered relative to each other,
   (c) folding the strip back and forth upon the rows of slots so as to turn the slots into notches that form at least one groove disposed on the periphery of the folded strip, and
   (d) enclosing the folded strip in a canister, the canister having at least one internal ridge that mates with the groove of the folded strip.

9. The method of claim 8, further comprising the step of coating the converter with a catalyst.

10. The method of claim 9, further comprising the step of affixing a pair of transition pieces to the input and output end of the converter.

* * * * *